Figure 1:
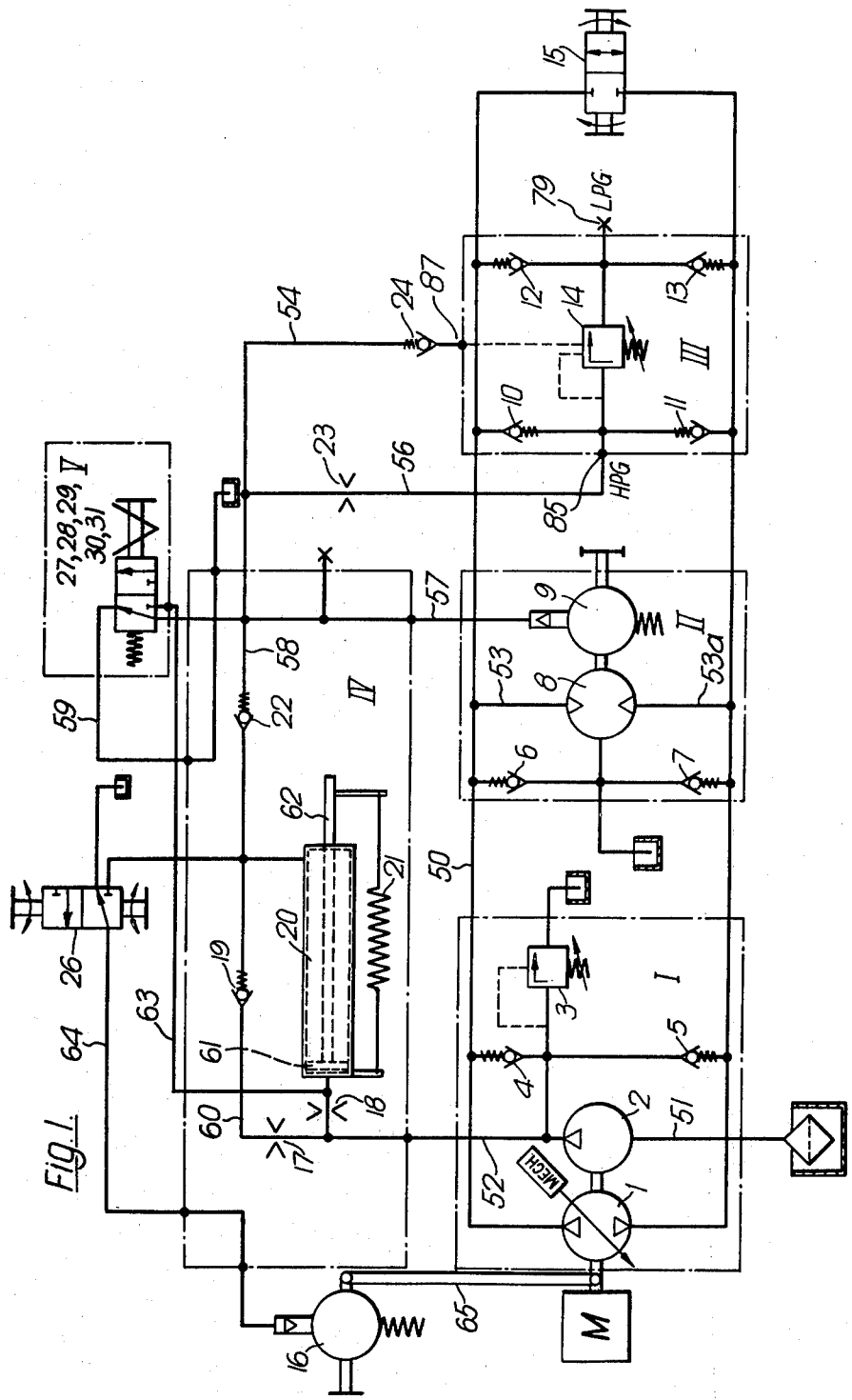

United States Patent [19]

Langworthy et al.

[11] 4,209,988
[45] Jul. 1, 1980

[54] SAFETY CONTROL SYSTEM FOR SELF-PROPELLED ROAD ROLLERS

[75] Inventors: Colin G. Langworthy, Bristol; Ralph G. Jefferies, Bitton Nr. Bristol, both of England

[73] Assignee: Stothert & Pitt Limited, Bath

[21] Appl. No.: 967,921

[22] Filed: Dec. 11, 1978

[30] Foreign Application Priority Data

Feb. 9, 1978 [GB] United Kingdom ............... 5250/78

[51] Int. Cl.² ............................................. F15B 15/18
[52] U.S. Cl. .......................................... 60/431; 60/464; 60/484; 404/103; 60/403
[58] Field of Search ......... 60/403, 423, 427, 431–433, 60/464, 484, 494, 905; 404/103, 102; 180/20, 82 B, 99, 103 BF; 188/151 A

[56] References Cited

U.S. PATENT DOCUMENTS

| | | | |
|---|---|---|---|
| 3,153,900 | 10/1964 | Pigeroulet et al. | 60/433 |
| 3,303,647 | 2/1967 | Futamata | 60/433 |
| 3,685,290 | 8/1972 | Krusche | 60/905 X |

*Primary Examiner*—Edgar W. Geoghegan
*Attorney, Agent, or Firm*—Frost & Jacobs

[57] ABSTRACT

There is shown a safety control system for a self-propelled road roller having hydrostatic transmission, which includes a prime mover, an hydraulic pump driven by the prime mover and included in a main hydraulic circuit incorporating a motor with a power-off brake device, a check valve bridge with a ventable relief valve and a main control valve, and means for selecting automatically the speed and a predetermined operating speed, the speed selecting means comprise a secondary hydraulic circuit including means operatively connectible with the prime mover speed control means and controllable by the ventable relief valve in accordance with the operation of the main control valve.

8 Claims, 4 Drawing Figures

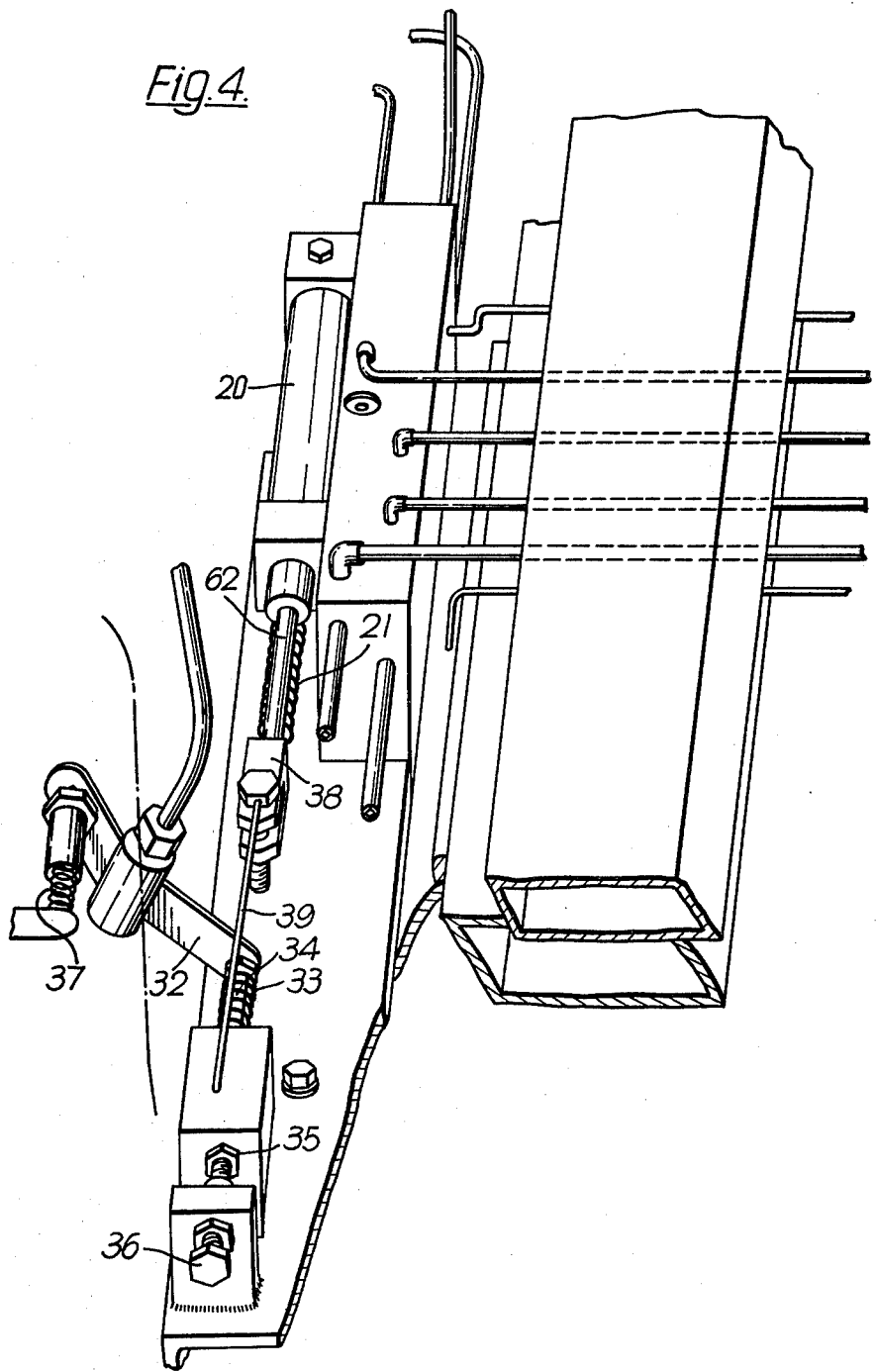

SAFETY CONTROL SYSTEM FOR
SELF-PROPELLED ROAD ROLLERS

This invention relates to a safety control system for self-propelled road rollers both of the non-vibratory and of the vibratory types.

With rollers designed to operate with a constant prime mover speed, it is not only desirable to take out of the operators hands the possibility of operating at an incorrect prime mover speed, but it is particularly desirable to provide an idling speed (particularly with I.C. engines) in order to reduce noise, fuel consumption and wear when the engine is running but the roller is not in working operation.

Furthermore, from the aspect of safety, it is desirable to eliminate the possibility of the machine being operated with its parking brake on, and also to ensure that the machine cannot be left by the operator with the parking brake disengaged. In addition, where a vibrator mechanism is fitted to the roller, it should also be ensured that this should not be operable other than at a correct rated engine speed, and also that it should become inoperative as soon as the machine is left unattended.

It is among the objects of the present invention to provide a safety control system which meets the aforementioned requirements.

According to the present invention, there is provided a safety control system for a self-propelled road roller with hydrostatic transmission including a prime mover; an hydraulic pump drivable by the prime mover and included in a main hydraulic circuit incorporating a motor with a power-off brake device, a check valve bridge with a ventable relief valve and a main control valve; and means for selecting automatically the speed of operation of the prime mover between a predetermined idling speed and a predetermined operating speed; wherein the speed selecting means comprise a secondary hydraulic circuit incorporating means operatively connectible with the prime mover speed control means and controllable by the ventable relief valve in accordance with operation of the main control valve.

According to the invention furthermore, the secondary circuit includes a charge pump capable of producing low pressure, a double-acting spring-loaded piston/cylinder unit operable, via timing orifices, and a check valve provided at a point of juncture with the main circuit and operable by the latter to increase the fluid pressure in the secondary circuit, the free end of the piston rod of said unit being operatively connectible with the prime mover speed control means.

According to another aspect of the invention, where the road roller incorporates a vibratory mechanism, the secondary hydraulic circuit includes a hydraulic vibrator clutch the operation of which is controllable by a selector control valve.

In accordance with a further feature of the present invention, the main hydraulic circuit includes a tow valve which is operable, in combination with the main control valve, to permit towing of the machine when the prime mover is inoperative.

Figure 2:
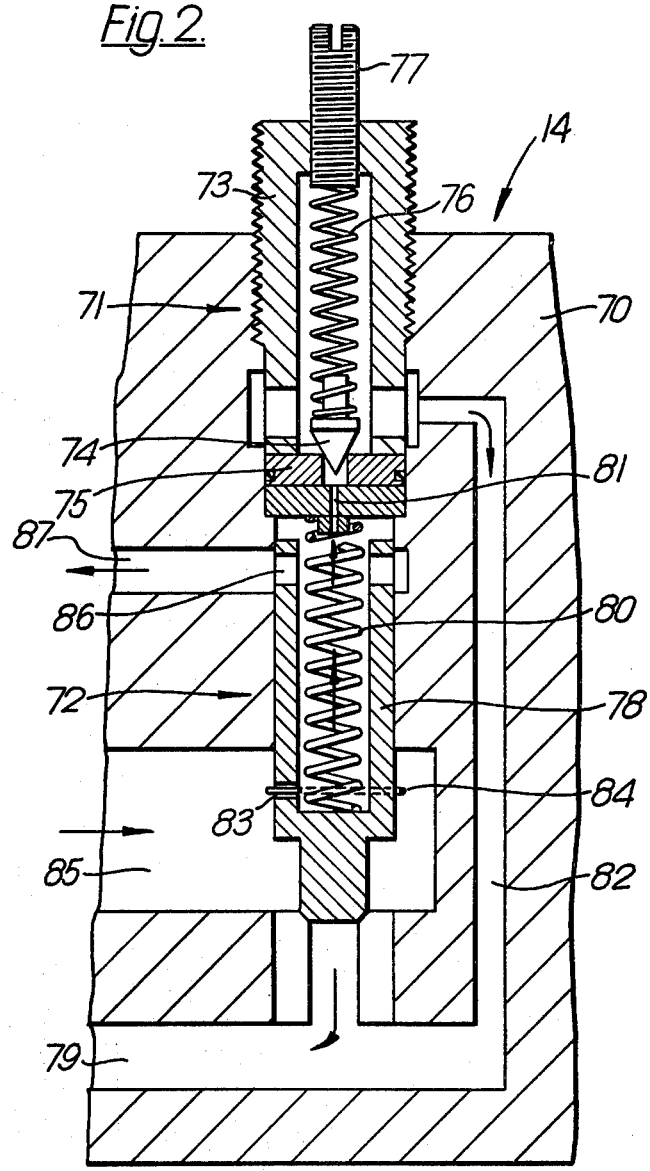
Figure 3:
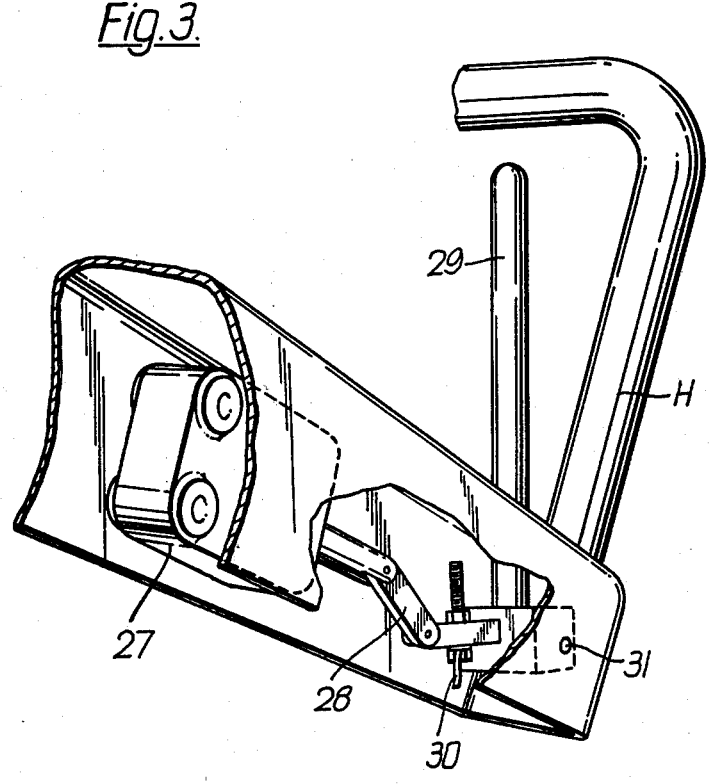

The invention is illustrated by way of example in the drawings accompanying the Provisional Specification in which, FIG. 1 is an hydraulic circuit showing the system according to the invention, FIG. 2 is a section through one form of ventable relief valve for use in the system, FIG. 3 is a fragmentary perspective view of one form of main control valve for use in the system, and FIG. 4 is a schematic perspective view showing the means for operating the prime mover speed control means.

Referring to the drawings, the system as applied to a self-propelled vibratory roller, comprises generally a pump assembly I, a combined motor brake unit II, an integral cross line bridge relief unloader assembly III, a prime mover speed selection assembly IV and a manually operated main control unit V. The assemblies I and III, and the units II and V, are positioned in a main hydraulic circuit 50.

The pump assembly I comprises a variable displacement swash plate piston pump 1 which is driven by a prime mover M, such as an I.C. engine, and has coupled thereto a fixed displacement boost or charge pump 2. The pump 2 is connected, via line 51, to a hydraulic fluid reservoir or tank, and also has a fluid output line 52 which supplies fluid to a secondary hydraulic circuit which is hereinafter described. The pump 2 communicates with the main circuit 50 via diverter check valves 4 and 5, a charge relief valve being provided at 3. Thus, in addition to supplying fluid to the secondary circuit, the pump 2 also serves as a make-up pump to replace fluid lost due to leakage in the system.

The unit II comprises a fixed displacement motor 8, which is in communication with the main circuit 50 via a fluid line 53 and 53a, and via case pressure limiting check valves 6 and 7, the motor 8 being coupled to a power-off spring applied brake device 9.

The assembly III comprises a ventable relief unloader valve 14 which is in communication with the main circuit 50 via rectifying check valves 10, 11, 12 and 13, the flow being via valves 10 and 13 or valves 11 and 12 dependent upon the direction of flow of the fluid in the main circuit.

One form of known relief unloader valve 14 which may be used is illustrated in FIG. 2 of the drawings which shows a Hamworthy P6262/1 valve. This valve comprises a valve body 70, a pilot stage 71 and a main stage 72. The pilot stage 71 consists of a cylindrical housing 73 screwed into the body 70 within which is mounted a poppet valve 74 coacting with a valve seat 75 under the action of a compression spring 76. The pressure exerted by the spring 76 can be varied by means of an adjusting screw 77.

The main stage 72 consists of a hollow piston 78 which is slidable in the body 70 and is urged into sealing engagement with a low pressure outlet port 79 by means of a compression spring 80. Fluid communication is provided between the main and pilot stages by means of an orifice 81, and a fluid passage 82 is formed in the body 70 to provide communication between the pilot stage and the low pressure outlet port 79. The piston 78 is formed with a transverse orifice 83 having an orifice wire 84, the orifice being open to a high pressure inlet port 85. The piston 78 further includes a vent connection 87, vented flow from connection 87 being passed through fluid line 54 having a check valve 24.

In using the particular valve 14 illustrated in FIG. 2, it is necessary to supplement the vent flow through line 54 with flow from the high pressure inlet port 85 which passes through line 56 having a brake timing orifice 23.

It will be appreciated that, during normal operation, the vent connection 87 will be closed and the system will be pressurised. If the system pressure is less than the cracking pressure, i.e. the pressure at which the poppet valve 74 is on the point of lifting off its seat 75 against the action of spring 76, the main stage piston 78 will be biassed by spring 80 to close outlet port 79. When the pressure in the system rises to a pressure greater than the cracking pressure, the poppet valve 74 is lifted off its seat and fluid flows through orifice 83 and orifice 81 into the pilot stage and, via the passage 82, to the low pressure outlet 79. As a result of this, there is a pressure drop across orifice 83 which upsets the force balance across the main stage and, the main stage piston 78 then opens to permit fluid flow to the low pressure side of the valve.

To unload, i.e. dump the system pressure, the vent connection 87 is opened to pass fluid to the reservoir or tank. This upsets the pressure balance across the main stage and the piston 78 will again lift off its seat thereby allowing fluid to pass from one side of the valve to the other. To bring the system back on load, the vent connection 87 is again closed.

The main circuit 50 further includes a fluid line 57 connected to the brake device 9, and also a check valve 22 provided in fluid line 58 which is in communication with lines 54, 56 and 57.

Unit V comprises, as shown in FIG. 3, a spring loaded selector valve 27 which is operable by a dead man's handle lever 29 associated with the steering handle H of the machine. The lever 29 is supported on a pivot pin 31 and is coupled to the plunger or slide of the valve 27 via pivotted linkage 28. A suitable stop element 30 is provided to limit movement of the lever 29. Fluid line 57, and also fluid lines 54, 56 and 58 are in communication with the selector valve as also is a line 59 to fluid reservoir or tank.

The assembly IV comprises a secondary hydraulic circuit 60, which is connected to the fluid output line 52 from the pump 2, and incudes an hydraulic cylinder 20 having a piston 61 and a piston-rod 62. One or more tension springs 21 are provided between brackets fixed respectively to the rear end of the cylinder 20 and the free end of the piston rod 62 so as to bias the piston rod 62 into a retracted position. Secondary circuit 60 includes a connection incorporating a timing orifice 17 and a check valve 19 to the front end of the cylinder 20, and to a vibrator selector control valve 26, and also a connection incorporating a timing orifice 18 to the rear end of the cylinder 20, the circuit being connected to fluid line 58 via the check valve 22.

In addition, a vent line 63 is provided between the connection to the rear of the cylinder 20 and the selector valve 27.

A further fluid line 64 is provided between the control valve 26 and the hydraulically operated pressure-on clutch 16 of a vibrator mechanism which is driven, via a mechanical connection 65, by the prime mover M.

As is shown in FIG. 4, the free end 38 of the piston rod 62 is provided to co-act with the governor spring 37 of the prime mover, for example, a Petter engine, through a butterfly lever 32. The lever 32 has a rod 34 slidable in a pair of spaced blocks, a compression spring 33 being mounted on the rod 34 between the lever 32 and the first block so as normally to urge the lever 32 away from the first block into a position where the prime mover is caused to run at a predetermined operating speed. This speed is adjustable by means of a stop 35. Under certain conditions, hereinafter described, the end 38 of the piston rod is caused to press the lever 32 against the action of the spring 33 and to move the spring 37 into a position where the prime mover is caused to run at a predetermined idling speed. This speed is adjustable by means of a stop 36.

In use, under start-up conditions, the dead man's handle 29 is in the released position as shown in FIG. 3 with the selector valve 27 positioned as shown in FIG. 1; the engine governor is in its operating speed position with the piston rod 62 fully retracted; the relief valve 14 is in its vented (by-pass) condition; the brake 9 is in its on position; and the vibrator selector control valve 26 will be in its closed position although, as hereinafter described, it could be in its open or operative position.

On being started up, the prime mover M transmits power to the transmission pump 1 and to the vibrator control mechanism. Flow from the pump 1 through the main circuit 50 is short-circuited across the rectifying bridge through the ventable relief unloader valve 14 and check valves 10 and 13 or 11 and 12 depending upon the direction of flow. Vented flow from the connection 87 of the valve 14 is returned to the fluid reservoir or tank via check valve 24, line 54, selector control valve 27 and line 59.

When sufficient charge pressure is generated in the charge pump 2, due to the pressure difference across orifice 17 and valve 19 relative to the orifice 18, the piston rod 62 is extended against the action of spring 21. After an appropriate delay period caused by the orifice 18 and spring 21, and also by the fact that the hydraulic fluid is cold and therefore more viscous, the end 38 of the piston rod 62 presses the lever 32 against the action of spring 33 and causes the governor to shut down the prime mover to the predetermined idling speed. During this time, fluid in excess of requirements to maintain the piston rod in an extended position, is vented to tank via orifice 17, valves 19 and 22, control valve 27 and line 59. For this reason, irrespective of the position of the vibrator control valve 26, there is insufficient pressure in the fluid line 60 between valves 19 and 22 to operate the vibrator clutch 16.

In order to effect normal running of the machine, the dead man's handle 29 is closed so that, by means of control valve 27, line 59 is closed, and so that vent line 63 communicates with line 59. This means that flow through control valve 27 from the connection 85 and the relief valve vent line 54 is closed, the build-up of pressure then causing valves 22 and 24 to close thereby pressurizing the brake device 9 causing it to lift off and release the brake.

At the same time, because pressure at the rear end of the cylinder 22 is vented via line 63, control valve 27 and line 59 to tank, the piston rod 62 is retracted. Retraction is effected by the action of the boost pressure passing through orifice 17 and valve 19 to the front end of the cylinder 20. Retraction is assisted by the action of the spring 21.

As a result of the piston rod 62 being retracted, the spring 33 moves the lever 32 into a position to accelerate the prime mover to its predetermined operating speed. At the same time, the vibrator clutch 16 is controllable by the control valve 26 under the action of the pressurized fluid in that part of the secondary circuit between valves 19 and 22.

In the aforementioned normal operating position, the machine speed is completely under the control of the pump swash plate and the main and secondary circuits are subject to the usual relief valve protection.

If, during normal operation, the dead man's handle 29 is released, control valve 27 is moved to open lines 54, 56, 57 and 58 to tank via line 59 thereby reducing fluid pressure in the hydraulic circuits, and also cutting off fluid flow via line 63 to tank. As a result of this reduction in pressure in the main circuit 50, the brake 9 is caused to move into its engaged position. Also, since line 63 is closed, the pressure differential over orifice 17 and valve 19 relative to orifice 18 causes the piston rod 62 to extend to cause the speed of the prime mover to be reduced to its idling speed as hereinbefore described. In addition, irrespective of the position of the control valve 26, because the secondary circuit is open to tank via valves 22 and 27, the vibrator clutch 16 will disengage.

In this condition, the machine is parked with the brake applied and with the prime mover turning over at idling speed.

On shutting down the prime mover, pressure in the hydraulic system, and thus in the cylinder 20, is released whereby the piston rod 62 retracts under the action of the spring 21 only thus leaving the engine governor in an operating speed position in readiness for start-up.

As is indicated hereinbefore, line 56 with brake timing orifice 23 is provided for use with the relief valve 14 illustrated in FIG. 2 to ensure that the brake lifts off in a predetermined period of time, and check valve 24 is provided to ensure stability in the relief valve 14. However, if by using another form of relief valve sufficient flow can be obtained via line 54 without causing instability of the valve, then line 56 with orifice 23, and also the check valve 24 in line 54, can be dispensed with.

An additional feature of the system is the provision, in the main hydraulic circuit 50, of a tow valve 15 which, together with a brake pull-off rod 39 attached to the end 38 of the piston rod 62, provide means to permit towing of the machine.

In order to tow the machine with the prime mover M inoperative, it is necessary to open tow valve 15 and to release the brake 9. The brake 9 can be released by depressing the dead man's handle 29 to move control valve 27 into its position for normal running of the machine, and by applying pressure via brake rod 39 to the piston 61. This creates pressure in the hydraulic system which closes check valves 19, 24, 10 and 11, as well as the relief valve main stage poppet so as to prevent oil escaping into the main loop via check valves 12 and 13, and serves to lift off the brake 9. If additional volume of fluid is required to effect this operation, i.e. more than one stroke of the piston 61 is necessary, valve 22 will, on release of the brake rod 39, close allowing fluid to be sucked into the cylinder 20 via valve 19 when the piston is released. Having released the brake 9, the machine can be towed or moved so long as the dead man's lever 29 is maintained in its depressed condition. As soon as lever 29 is released, pressure in the system is relieved and the brake 9 will immediately be applied. Thus, it will be seen that safety of the machine is maintained even when the prime mover is not in operation.

Although the invention has been described with reference to a vibratory roller, it will be understood that it can also be applied to a non-vibratory roller. Thus, the vibratory mechanism and the vibrator clutch control valve 26 can be dispensed with without affecting the system hereinbefore described.

It will be appreciated that the system of the invention has the following advantages:

1. Complete safety is provided for the operator in that, unless he is in control of the machine and is holding the dead man's lever, the machine cannot operate.
2. By integrating the engine shut-down and the vibrator clutch, it is not possible to leave the machine unattended and vibrating. Such a condition can be particularly dangerous when reversing down a gradient.
3. By shutting the engine down automatically to idling speed, wear on the machine is reduced, fuel consumption is reduced, there is less environmental noise, and the possibility of cavitation in the hydraulic pump at low engine revolutions is eliminated.
4. Operation of the dead man's handle is completely independent of the pump swash position and it is not therefore necessary to return the pump to neutral when starting off after an emergency stop as with some systems.
5. It is possible, as hereinbefore described, to use the same means for lifting off or releasing the brake when towing the machine whilst still retaining the safety of the dead man's handle.
6. Easier starting—machine is completely off-loaded and the engine governor is set for high speed on start-up.

We claim:

1. A safety control system for a self-propelled road roller with a hydrostatic transmission, including a prime mover; an hydraulic pump drivable by the prime mover and included in a main hydraulic circuit incorporating a motor with a power-off brake device, a check valve bridge with a ventable relief valve and a main control valve; and means for selecting automatically a predetermined operating speed for said prime mover; wherein said speed selecting means comprise a secondary hydraulic circuit incorporating means operatively connectible with said prime mover speed control means and controllable by said ventable relief valve in accordance with the operation of said main control valve.

2. A system as claimed in claim 1, wherein said secondary circuit includes a charge pump capable of producing low pressure; a double acting spring-loaded piston/cylinder unit operable, via timing orifices; and a check valve provided at a point of juncture with said main circuit and operable by said main circuit to increase the fluid pressure in said secondary circuit, the free end of said piston rod of said piston/cylinder unit being operatively connectible with said prime mover speed control.

3. A system as claimed in claim 2, in which said free end of said piston rod co-acts with the governor spring of said prime mover via a butterfly lever, said butterfly lever co-acting with a slidably mounted rod which is urged, by spring means, into a position where said prime mover is normally caused to run at said predetermined operating speed.

4. A system as claimed in claim 3, in which stop means are provided to adjust the biassed position of said slidable rod so as to permit said predetermined operating speed to be varied.

5. A system as claimed in claim 4, wherein said main hydraulic circuit includes a tow valve, to permit towing of the machine when said prime mover is inoperative.

6. A system as claimed in claim 5, wherein a brake pull-off rod is attached to said piston rod of said piston/cylinder unit to facilitate manual operation of said piston/cylinder unit.

7. A system as claimed in claim 4, in which said main control valve includes a spring-loaded control valve operable by a dead man's handle lever associated, when in its position of use, with a steering handle of the machine.

8. A system as claimed in claim 7, wherein, for use with a road roller having a vibratory mechanism, said secondary hydraulic circuit includes a hydraulic vibrator clutch and a selector control valve which controls the operation of said clutch.

* * * * *